United States Patent [19]
Marshall

[11] Patent Number: 5,967,440
[45] Date of Patent: Oct. 19, 1999

[54] PRETENSIONER FOR A SEATBELT RETRACTOR

[75] Inventor: Stephen John Marshall, Low Seaton Cumbria, United Kingdom

[73] Assignee: Breed Automotive Technology, Inc., Lakeland, Fla.

[21] Appl. No.: 08/909,412

[22] Filed: Aug. 11, 1997

[30] Foreign Application Priority Data

Aug. 13, 1996 [GB] United Kingdom ................ 96 17 004

[51] Int. Cl.⁶ ........................... B65H 75/48; B60R 22/36
[52] U.S. Cl. ............................................ 242/374; 280/806
[58] Field of Search ........................... 242/374; 280/806, 280/807, 805

[56] References Cited

U.S. PATENT DOCUMENTS

| | | | |
|---|---|---|---|
| 5,310,219 | 5/1994 | Föhl | 280/806 |
| 5,351,485 | 10/1994 | Hiruta | 242/374 |
| 5,553,890 | 9/1996 | Buhr et al. | 242/374 |

FOREIGN PATENT DOCUMENTS

| | | |
|---|---|---|
| 2 217 181 | 3/1989 | United Kingdom . |
| 2 220 128 | 6/1989 | United Kingdom . |
| 2 223 666 | 9/1989 | United Kingdom . |
| 2 274 384 | 1/1994 | United Kingdom . |

*Primary Examiner*—John Q. Nguyen
*Attorney, Agent, or Firm*—Markell Seitzman

[57] ABSTRACT

A pretensioner for use with a retractor for a vehicle safety restraint to rapidly take up slack in a safety belt system at the onset of a crash situation so as to more correctly and securely restrain the vehicle occupant and to more correctly position him for maximum effect of an inflatable safety device such as an air bag. The pretensioner comprises a piston-cylinder arrangement in which a piston is driven along the inside of a cylinder under force provided, for example, by a spring or by a gas generator. The pretensioner has a resilient seal around the piston and the cylinder to provide load limiting at the start of the pretensioner stroke. Safety arrangements are provided for ensuring that the pretensioner is not activatable before installation in the vehicle, and the gas generator is constructed to ensure that there are no loose parts after detonation, which could cause damage. A bearing for the cylinder is provided for use when the piston-cylinder forms the crash sensor.

17 Claims, 9 Drawing Sheets

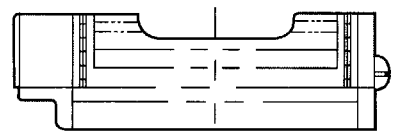
Fig. 4b
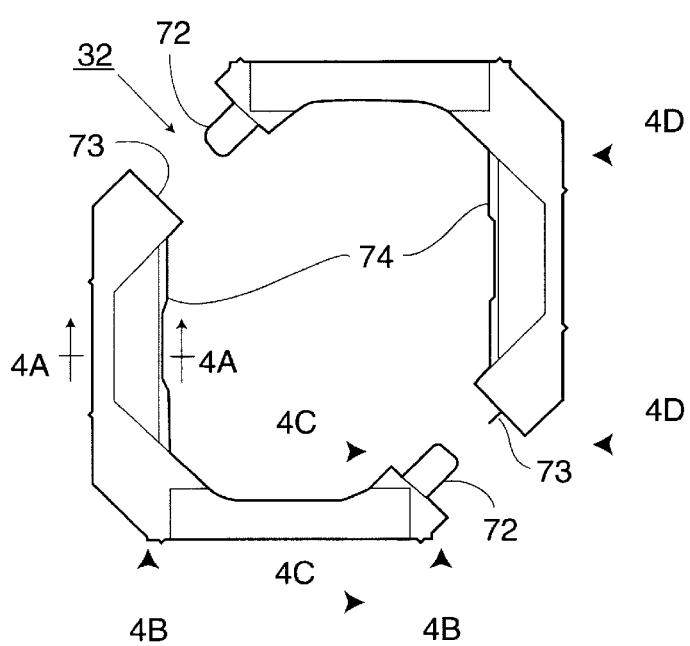
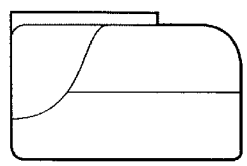
Fig. 4c
Fig. 4
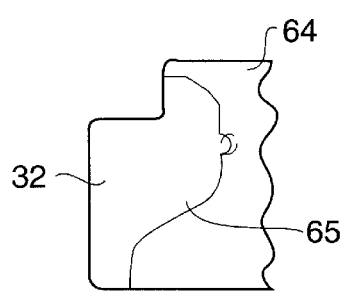
Fig. 4a
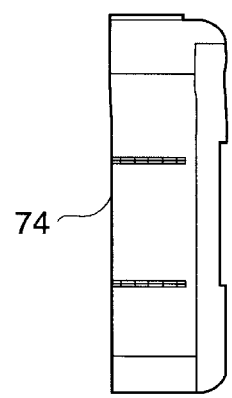
Fig. 4d

PRETENSIONER FOR A SEATBELT RETRACTOR

SUMMARY OF THE INVENTION

The present invention relates to a pretensioner for use with a retractor for a vehicle safety restraint. Pretensioners are used to rapidly take up slack in a safety belt system at the onset of a crash situation so as to more correctly and securely restrain the vehicle occupant and to more correctly position him for maximum effect of an inflatable safety device such as an air bag.

Known pretensioners comprise piston-cylinder arrangements in which a piston is driven along the inside of a cylinder under force provided, for example, by a spring or by a gas generator. The piston is attached to one end of a cable, the other end of which may be attached to a rewind mechanism of a safety restraint retractor so that movement of the piston rewinds the belt webbing by an appropriate amount.

Various problems arise with such pretensioners and it is an object of the present invention to provide an improved pretensioner arrangement.

Aspects which the present invention particularly addresses include the seals around the piston and the cylinder, load limiting at the start of the pretensioner stroke, safety arrangements for ensuring that the pretensioner is not activatable before installation in the vehicle, and construction of the gas generator to ensure that there are no loose parts after detonation, which could cause damage to vehicles or their occupants.

Pretensioners incorporate crash sensors and this is often effected by inertial means such as a pendulum sensor. In one known type of pretensioner the pistoncylinder itself acts as an inertial crash sensor by being weighted with an additional mass and mounted on a bearing at one end of the tube in which the cylinder is housed. Usually movement is restricted to one dimension (the forward-backward dimension of the vehicle). The present invention addresses aspects of such a bearing.

Thus according to one aspect of the present invention there is provided a pretensioner arrangement for a vehicle safety restraint retractor, the pretensioner comprising:

a piston movable along a cylinder under action of gas from a gas generator, the piston being connected to one end of a cable, the other end of which is connected to means for shortening the effective length of belt webbing available to the vehicle occupant, wherein an elastomeric seal is provided on the piston at its end which connects to the cable, such that the elastomeric seal temporarily absorbs some of the force generated by the gas generator on detonation of the pretensioner when a crash situation is sensed.

This has the advantage that a smaller initial force is applied to the piston than would otherwise be the case making sudden breakages of the cable less likely. However the resilient nature of the seal of the invention allows it to be compressed and prevents any overall lost force and so there is no significant overall loss of gas pressure in the cylinder, giving improved performance over known systems. Preferably the seal is made of Elastollan, a resilient plastics material.

In some known systems an initial load limiting is achieved by providing a leakage path which dissipates the power applied to the piston but obviously this lowers the gas pressure, and reduces overall efficiency.

The safety of the device during transport and storage before it is fitted into a vehicle is of paramount importance. This is particularly so with a pyrotechnic pretensioner since this contains a small amount of explosive substance. There are known systems to hold a pretensioner in a de-activated state before fitting but they are complex requiring several steps in the de-activation procedure.

The present invention aims for a simpler and safer safety mechanism.

According to a second aspect of the present invention there is provided a pretensioner for a vehicle safety restraint comprising a piston cylinder arrangement for drawing in belt webbing under action from a source of driving force, a mechanical pendulum sensor mounted on a bearing so as to pivot under the action of an inertial crash acceleration force, to a position in which it effects release of the driving force, wherein the free end of the pendulum sensor comprises a first abutment which is restrained by a co-operating lever on the pretensioner housing, the lever being biased to a restraining position and being deflectable therefrom to allow movement of the pendulum sensor when a mounting bolt is inserted through a mounting hole in the housing to mount the pretensioner in a vehicle.

In a preferred embodiment in which the crash sensor is formed by the piston-cylinder arrangement itself, the restraining abutment is formed by an extension attached to the free end of the cylinder and there is a slot on the retractor frame blocked by the lever in the restraining position and through which the extension can pass when the lever is deflected.

According to a third aspect of the invention the gas generator comprises a burst disc at one end through which the gas is released on detonation, the burst disc being circumscribed by a line of weakness around a substantial part of its periphery and having a segment of its periphery reinforced so that on detonation of the gas generator, the opened burst disc in retained attached to the gas generator by the reinforced segment.

The gas generator is usually formed of aluminium and a fourth aspect of the invention provides for one end of the gas generator to be reinforced by a steel ring with a diameter slightly larger than the diameter of the one end. According to a preferred embodiment a sensor lever rests against the gas generator in the region of the steel ring and in this case the sensor lever is preferably reinforced with a steel pin incorporated into its structure. This sensor lever may be provided with a curved profile which reduces friction. A coating of molycote also aids in reducing friction.

According to a fifth aspect of the invention a novel bearing is provided particularly for the embodiment in which the piston cylinder arrangement forms the crash sensor.

The bearing is formed of a hollow square of plastics material having two opposite sides formed with crush ribs on their inner faces, structured and dimensioned to provide a close fit with co-operating recessed surfaces of the cylinder. The other two sides of the square have internal faces which do not grip the cylinder. The co-operating surface of the cylinder is formed with a circumferential channel of semi-circular cross-section. The bearing will allow pivoting of the cylinder in a direction parallel to the engaging bearing faces (the crush ribs) but not in a direction perpendicular to the crush ribs since in that direction the bearing is held fast in the recess in the cylinder.

Preferably the outer facing four surfaces of the bearing are arranged to co-operate with internal features of a cylinder housing. For example, two opposite outward facing surfaces may each have an upwardly facing ledge to co-operate with respective inwardly deformable cut-outs on corresponding faces of the cylinder housing. The other two outwardly facing surfaces may be provided with downwardly facing ledges to rest on projections from the other two internal faces of the cylinder housing. In this way the bearing is held fast in the housing and prevented from longitudinal and lateral movement.

Preferably the bearing is formed of two identical moulded plastics L-shaped parts, one of which is turned through 180° and the two of which are clipped together by tight fitting peg and hole connections.

For a better understanding of the invention and to show how the same may be carried into effect, reference will now be made to the accompanying drawings in which:

BRIEF DESCRIPTION OF THE DRAWINGS

FIG. 4 shows various cross-sectional views of the bearing used in the pretensioner shown in FIG. 2.

FIG. 4A is shows a cross-section drawn along line A—A in FIG. 4.

FIG. 4B is a plan view of one side of a bearing retainer.

FIG. 4C which is a cross-section taken along line C—C of FIG. 4.

FIG. 4D is a plan view of another side of the bearing retainer.

FIG. 7a is a front cross-sectional view of a retractor pretensioner. 7b is a cross-sectional view through line b—b of FIG. 7a.

DETAILED DESCRIPTION OF THE DRAWINGS

Figure 1:
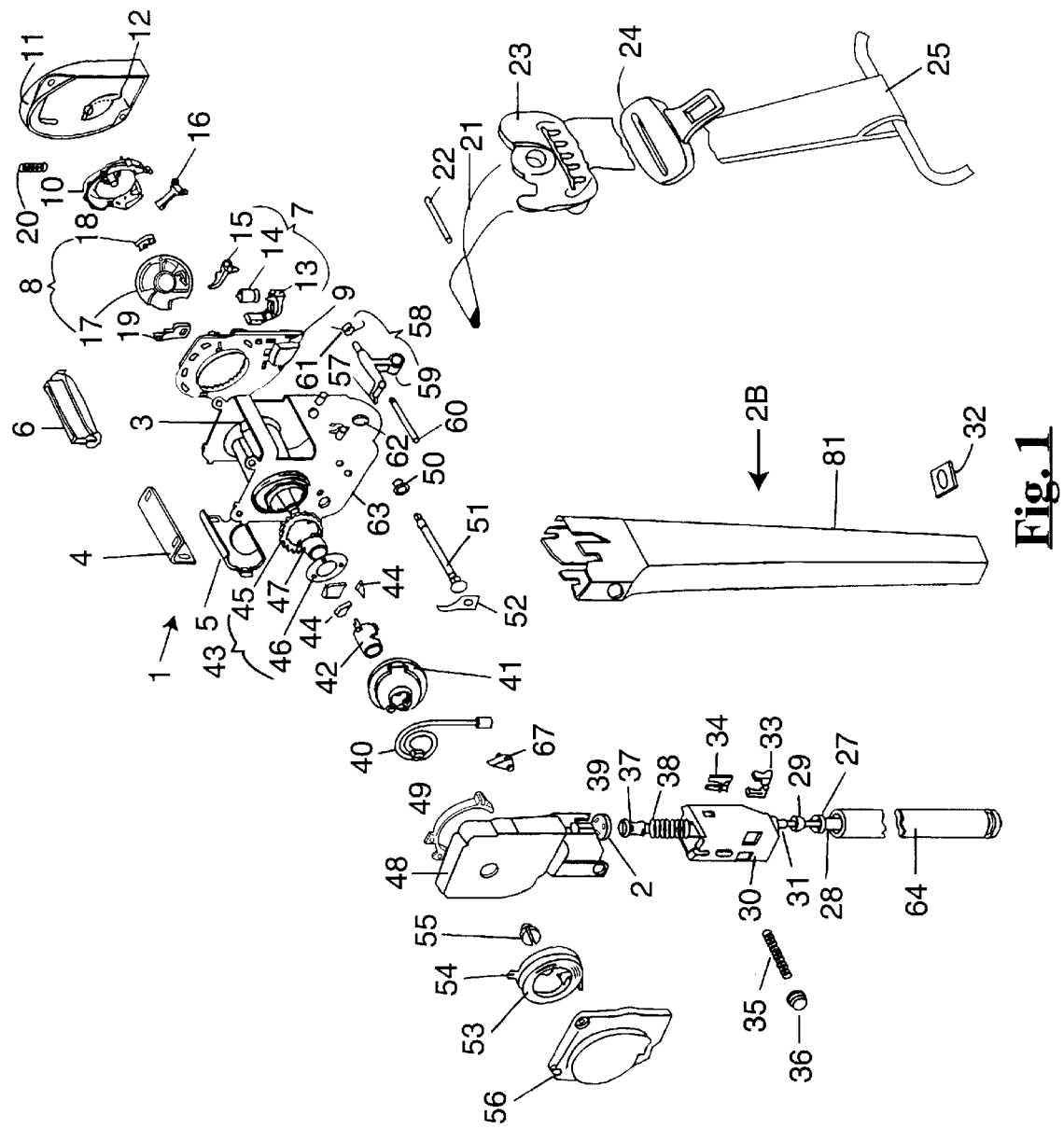
FIG. 1 is an exploded view of a safety restraint retractor incorporating a pretensioner including many aspects of the present invention.

In FIG. 1 a retractor 1 is shown comprising a frame 2 in which is mounted a spool 3 which holds seat belt webbing 21 which is fixed in the spool by a retaining webbing pin 22. The webbing passes from the spool through the webbing guide 6 through a direction changing loop 23 (also known as a D-ring), through a buckle tongue 24 and is fixed in the vehicle around slider bar 25 which is fastened to the floor or chassis of the vehicle.

Upper and lower tie plates 4, 5 hold the frame together and the webbing guide 6 is fixed to the top of the frame 2. On the right-hand side of the frame 2 (as shown in FIG. 1) a vehicle sensor 7 and a webbing sensor 8 are mounted between mechanism bush 9 and multi-function piece 10 and protected from ingress of adverse environmental conditions by mechanism cover 11 sealed by cover seal 12.

The vehicle sensor 7 comprises vehicle sensor housing 13, mass assembly 14, primary lever 15 and secondary lever 16.

Webbing sensor 8 comprises inertial disk 17 and web sensor pawl 18. Activation of either of the sensors causes locking of the spool via lock bar 19. The lock bar is connected via a lock bar bush 50 and a tie bar 51 to a spring side lock bar 52. In this way when either the vehicle sensor or the web sensor operate further pay out of webbing is prevented by locking of the spool on both sides of the mechanism (pawl 19, 52). A lock cup return spring 20 is also provided. The construction and operation of these parts will be evident to a person skilled in the art who will also introduce, as required, screws, shims and any other minor elements such as springs or pins as required.

On the left-hand side of the frame 2 is the pretensioner 26. This comprises a piston 27 which is attached by crimping to one end of a cable 28 and is sealed by a compressible elastomeric, energy absorbing piston seal 29. The piston 27 is housed in a pressure tube or cylinder 64. The cable 28 passes through a mass 30 to which it is sealed by mass seal 29. In FIG. 1 the cable is not shown exiting from the mass 30 since lack of space does not permit. However the course of the cable will be more clearly seen from subsequent Figures. The piston cylinder mass arrangement acts as a pendulum crash sensor. To this end it is mounted in cover 31 and supported therein at its lower end by bearing retainer 32. A swivel bar 33 and sensor lever 34 are located to one side of the mass 30 whereas a sensor spring 35 fitting into a sensor spring cap 36 are located on the other side of the mass 30, within the cover 31.

In a top recess of the mass 30 a gas generator 37 mounted within a firing spring 38 is located. A firing pin plate 39 sits on top of the gas cylinder. Movement of the piston cylinder mass pendulum arrangement within the cover 31 will cause detonation of the gas generator and hence activation of the pretensioner.

Activation of the pretensioner causes the piston 27 to move down the cylinder 64 and hence to pull the cable 28. The cable passes through the mass 30 and is wound at its other end 40 around a spiral assembly 41. Thus when the piston pulls the cable 28, the spiral assembly 41 is rotated (as shown this would be in a clockwise direction). Rotation of the spiral 41 rotates a steering part 42 and causes a clutch arrangement 43 to move into engagement. Clutch clamping jaws 44 are spiralled outwards by movement of steering part 42 to engage ratchet 45 and thus to rotate the spool in a webbing take-up direction. The clamp jaws 44 are supported by support disk 46 and clutch bearing sleeve 47 and are located within clutch housing 48 by means of a packing element 49.

The standard spiral retraction spring 53 is mounted on retraction spring shim 54 and connected to the spool 3 by spring arbour 55. These parts are covered by a spring cover 56.

A safety lockout device is also provided for the pretensioner and is indicated at 58. This is a safety device which prevents the pretensioner firing when it is not fixed in a vehicle. This lockout device comprises a lockout lever 59 which is mounted on a lockout shaft 60 inside the frame 2. At one end of the lockout lever 59 is located a lockout pawl 57. A lockout spring 61 is located at the other end of the lockout lever 59 so as to bias to a position where the bulbous head sits adjacent frame mounting hole 62 and the lockout pawl blocks a cutout 63 on the side of frame 2. Insertion of a screw or bolt through the frame mounting hole 62 will act on the bulbous part of the lockout lever 59, against the lockout spring 61, to urge the bulbous part away from the mounting hole 62 and thus to rotate the lockout pawl 57 upwards (i.e. clockwise in FIG. 1). In the unmounted state of the retractor pretensioner arrangement, the interlock lever 57 blocks a small cut out 63 in the side of frame 2. Adjacent to this cut out 63 and to the lockout pawl 57 is located the conical upper extension of firing pin plate 39. Thus when the retractor pretensioner arrangement is not fitted in the car, for example during assembly and transport, the firing pin plate is prevented from moving (to the left in FIG. 1). Since the firing pin plate, is the assembled mechanism, is an integral part of the piston cylinder mass pendulum sensor, arrangement, then the pendulum is prevented from moving even under conditions of shock similar to those experienced during a crash. Thus the pretensioner is prevented from firing and is in a safe condition. However, when a bolt or screw is passed through frame mounting hole 62, the lockout lever 59 is rotated (clockwise) and lockout pawl 57 clears the hole 63 so that firing pin plate 39 can move. Thus when the retractor pretensioner is mounted in a vehicle the pretensioner is armed.

An interlock lever 67 is provided to prevent rotation of the spiral until or unless the pretensioner is operated.

Figure 2:
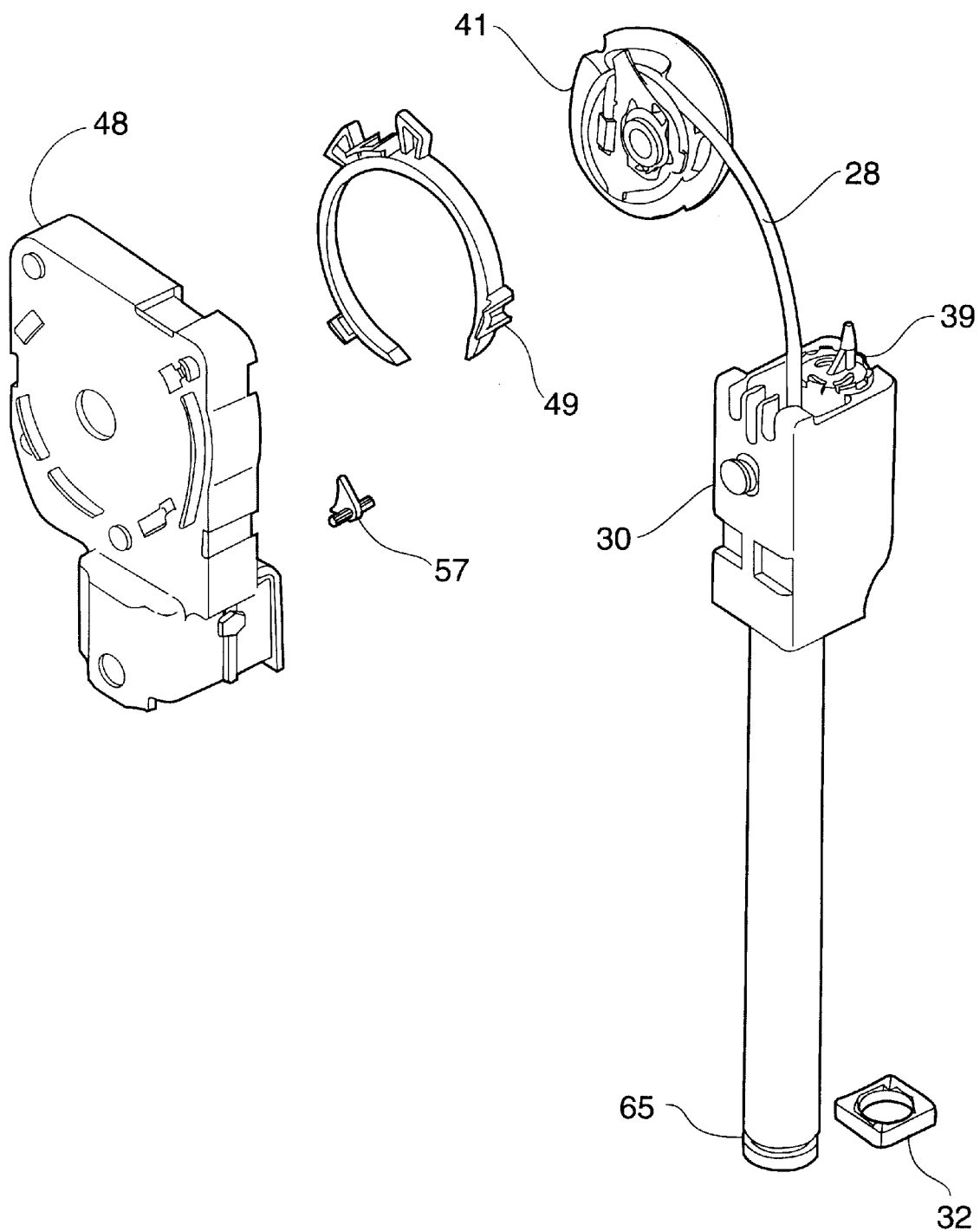
FIG. 2 is an enlarged view of part of FIG. 1 showing the cylinder mass and cable arrangement in more detail.

FIG. 2 shows the pressure tube and mass arrangement in more detail. Like parts are denoted by like reference numerals. Pressure tube 64 mounted to sensor mass 30 at the top of which can be seen the firing pin plate 39. Cable 28 passes out of the pressure tube 64, through the mass 30 and is wound around spiral member 41. The spiral 41 is housed within clutch housing 48 and held there by the packer clip 49.

Bearing retainer 32 fits around the bottom of the pressure tube 64 and is located there by means of a circumferential recess 65.

Figure 3:
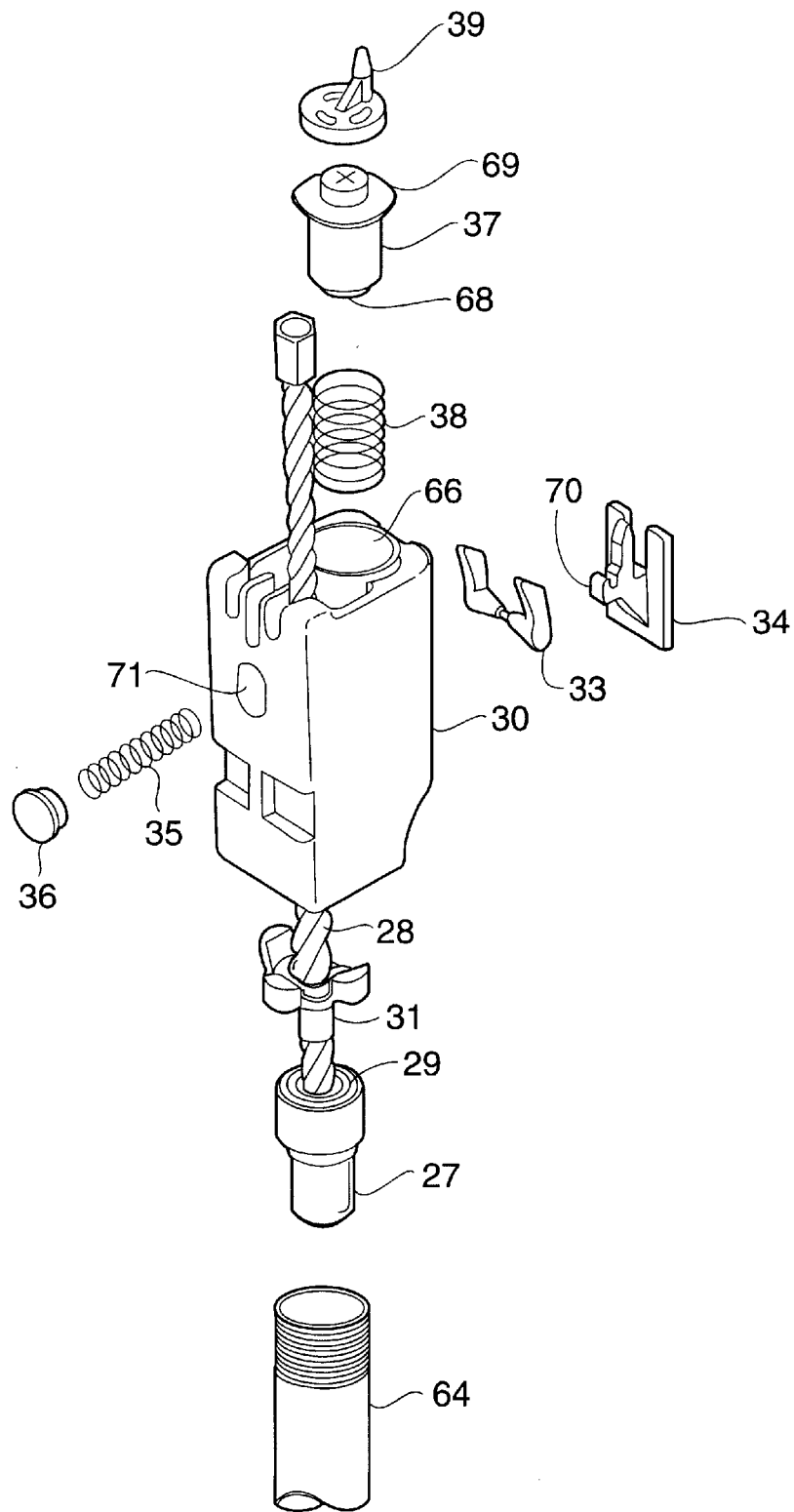
FIG. 3 is an enlarged view of part of the pretensioner shown in FIG. 2 giving more detail.

FIG. 3 shows the connection of the cable to the piston in more detail. Again like parts are denoted by like reference numerals. Firing pin plate 39 is located on top of gas generator 37 which is mounted in firing spring 38 in a recess 66 of sensor mass 30.

In FIG. 3 the gas generator can be seen more clearly. It comprises a burst disk 68 at one end through which gases released when the pretensioner is activated. This burst disk is formed with a segment of its circumference reinforced to act as a hinge when the gas is expelled. In this way the burst disk remains attached to the gas generator and there are no loose parts.

The other end of the gas generator is reinforced with a steel ring having a diameter slightly larger than the diameter of the end on which it is mounted. The steel ring is denoted by reference 69. The sensor lever 34 mounted on swivel bar 33 rests against the gas generator 37 in the region of this steel ring 69. The sensor lever is reinforced with a steel pin 70 incorporated into its structure. This prevents excessive wear on the sensor lever. Friction between the sensor lever and the swivel bar is reduced by using a coating of molycote on the sensor lever and is further reduced by the curved profile used on the sensor lever where it engages the swivel bar 33. This sensor lever and swivel bar hold the generator in place within the body of the mass 30. A temporary clamp may be used to hold the members in place during assembly of the pretensioner. The firing pin plate 39 is crimped into the top of recess 66 in mass 30.

The sensor spring 35 is compressed when assembled into aperture 71 of mass 30 and is held in place by sensor spring cap 36.

The cable is sealed into mass 30 by mass seal 29 which is held in place in mass 30 when pressure tube 64 is screwed into the mass. The end of cable 28 passes through piston seal 29 into piston 27 wherein it is crimped. A gap is provided as shown in mass seal 29 to enable gas from gas generator 37 to pass into pressure tube 64.

FIG. 4 illustrates the bearing retainer 32.

This is made in two parts which may be moulded from an identical moulding process. One of the parts is turned through 180° and the two parts are interlocked by means of tabs 72 which provide a snug fit into cooperating holes 73. In its assembled condition the bearing retainer 32 has two opposing internal surfaces formed with crush ribs 74. These crush ribs 74 have the same profile as the generally semi-circular recess or channel 75 at the bottom end of pressure tube 64. This is more clearly shown in FIG. 4A which shows a cross-section drawn along line A—A in FIG. 4. This engagement means that the bearing retainer 32 cannot move in the dimension defined by the line A—A. However the other two opposing faces of bearing retainer 32 do not, in the assembled condition, contact the surfaces of the pressure tube 64. This is shown in FIG. 4C which is a cross-section taken along line C—C of FIG. 4. Hence movement in the dimension defined by the line C—C is possible and the bearing retainer 32 pivots on the crush ribs 74.

FIG. 4B is a side view of one half of the bearing retainer 32 as seen in the direction B and FIG. 4D is a side view of one half of the bearing retainer 32 as seen in direction D.

Figure 5:
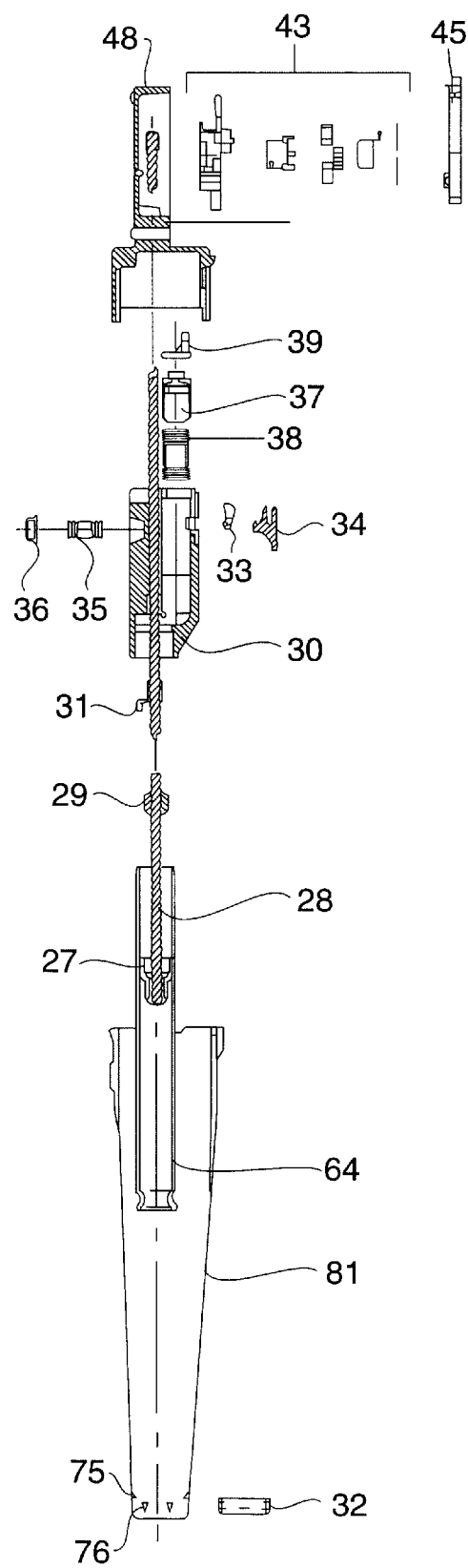
FIG. 5 is an exploded cross-sectional view illustrating the piston cylinder mass and cable arrangement of FIG. 2.

FIG. 5 is an exploded cross-sectional view of the pretensioner arrangement of FIG. 1. Like parts are denoted by like reference numerals and thus it will be seen that clutch parts 43 comprise the spiral member, steering part, clamp jaws, clutch bearing and support disk. The clutch is mounted in between clutch housing 48 and ratchet 45. Clutch housing 48 is mounted on sensor mass 30. Firing pin plate 39 is located on top of gas generator 37 which is mounted in spring 38 in the top of mass 30. The sensor lever 34 and swivel bar 33 are mounted at one side of mass 30. Sensor spring 35 is mounted in the other side of mass 30 and retained there by spring cap 36.

Mass seal 29 is shown engaging cable 28. In the embodiment of FIG. 5 the mass seal 29 is shown inverted compared to its orientation in FIG. 1.

The cable 28 also passes through piston seal 29 and is crimped into piston 27. Piston 27 is located in pressure tube 64 which is pivotally retained at its lower end in cover 81 by means of bearing retainer 32 which co-operates with the inwardly deformable tabs 75 and projections 76 at the lower end of cover 81.

Figure 6A:
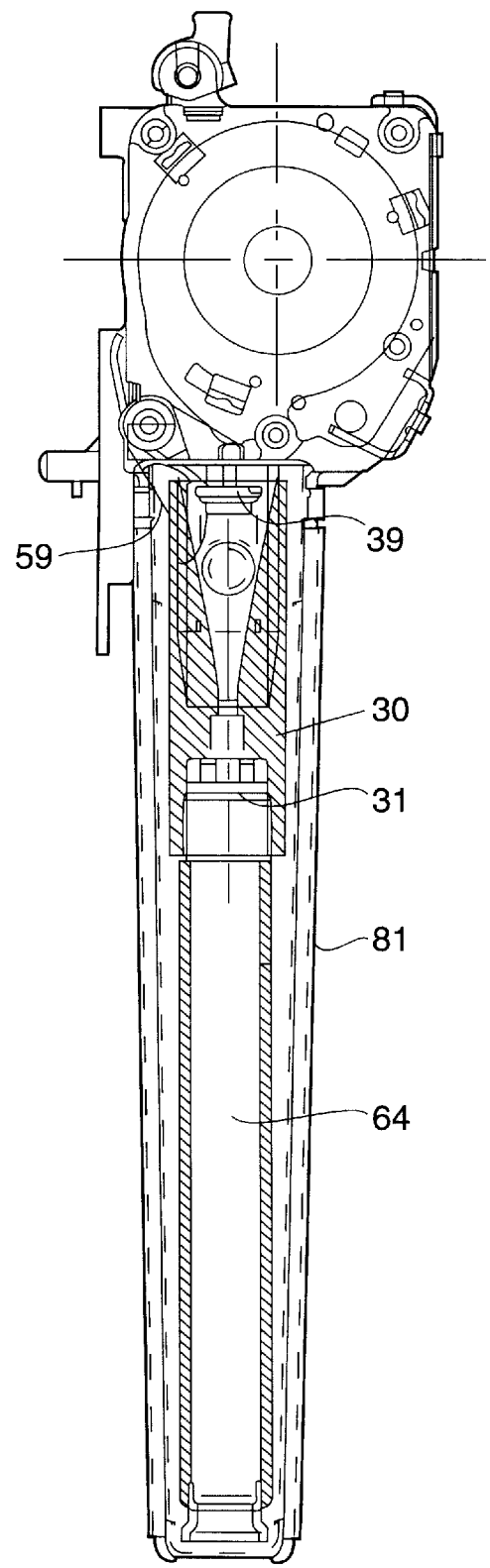
FIG. 6a is a cross-sectional side view of the retractor pretensioner.

FIG. 6a is a cross-sectional side view of the retractor pretensioner arrangement before it is fitted into a vehicle.

Figure 6B:
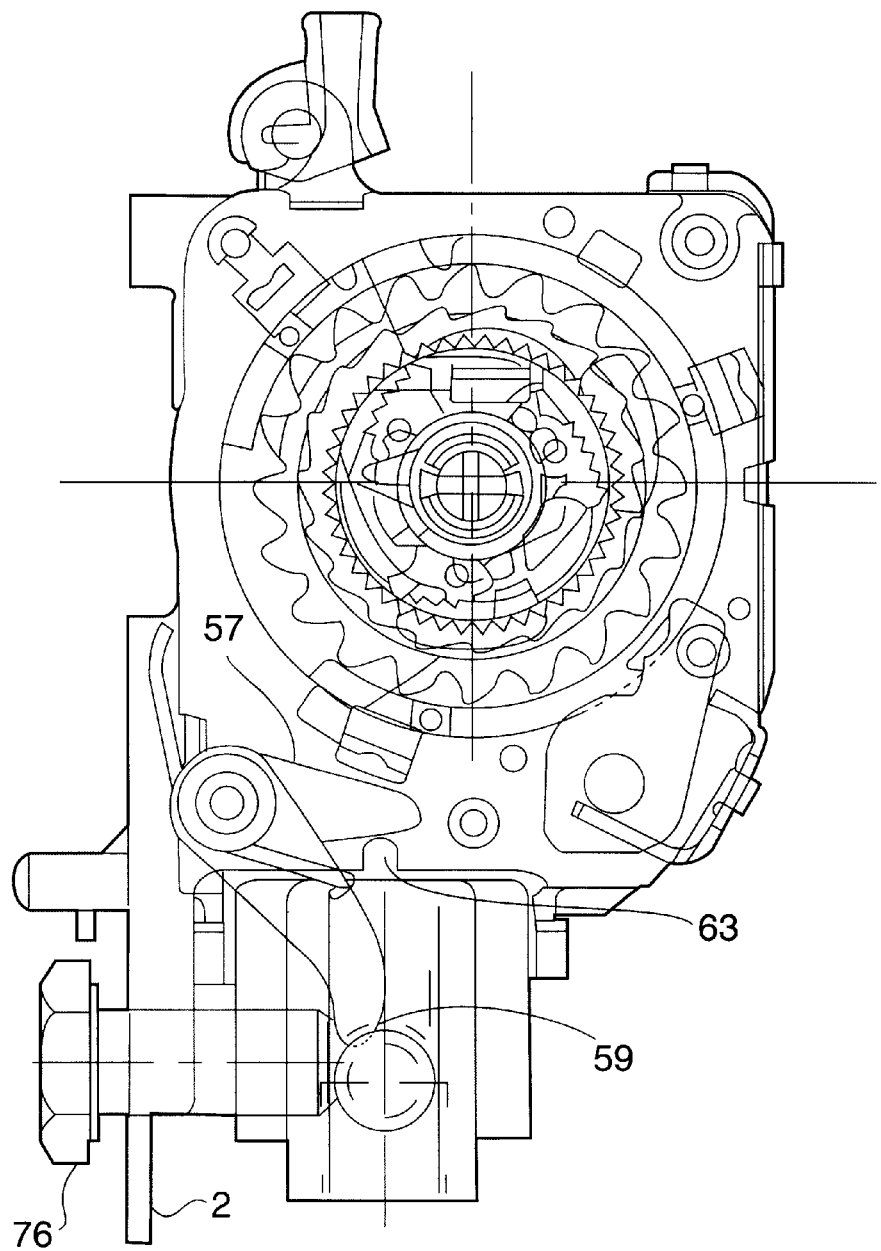
FIG. 6b is a side cross-sectional view of part of the for pretensioner fitted within a vehicle.

FIG. 6b is a side cross-sectional view of part of FIG. 6a with the retractor pretensioner fitted in the vehicle.

The difference between FIGS. 6a and 6b resides in the insertion of bolt 76 through the fixing hole in the frame. Bolt 76 deflects the lockout lever 59 and lifts the lockout pawl 57 away from frame cutout 63. This clears the frame cutout 63 for the upper conical projection of firing pin plate 39 to pass through and thus the pretensioner is armed.

The other features of FIGS. 6a and 6b will be clear from a comparison with previously described Figures.

Figure 7A:
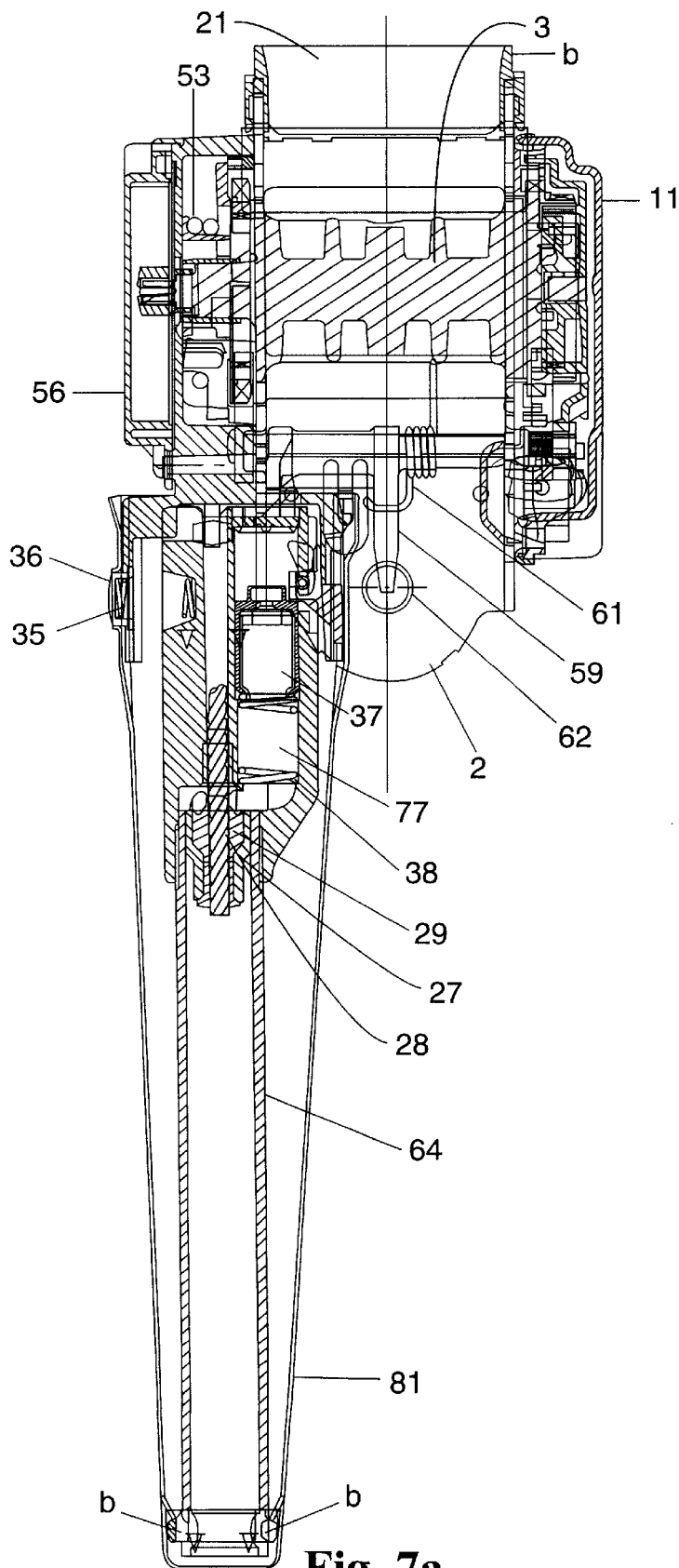

FIG. 7a is a front cross-sectional view of the retractor pretensioner. Again like parts are denoted by like reference numerals and the operation of the retractor pretensioner will be evident from a comparison with previously described Figures. FIG. 7a illustrates more clearly a connecting passage 77 between the gas generator 37 and the pressure tube 64.

Figure 7B:
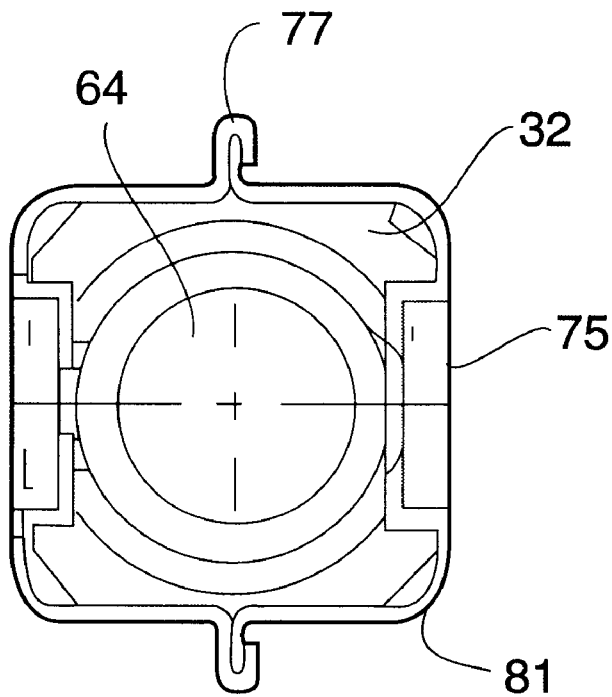

FIG. 7b is a cross-sectional view through line b—b in FIG. 7a and illustrates the bearing retainer 32 and its co-operation with the retaining flaps 75. It can be seen from FIG. 7b that the cover 81 is traditionally made from two parts interlocked together by press seems 77.

I claim:

1. A pretensioner arrangement for a vehicle safety restraint retractor, the pretensioner comprising
   a cylinder,
   a piston slidably contained within the cylinder having a cable receiving end,
   a gas generator, operable to release gas to produce a force to drive the piston along the cylinder,
   a cable having first and second ends and connected at said first end to the cable receiving end of the piston,
   means for shortening the effective length of belt webbing available to a vehicle occupant, said means being connected to said second end of the cable,
   a compressible elastomeric energy absorbing seal provided on the piston at said cable receiving end thereof, for absorbing some of the force generated by the gas from the gas generator,
   further including bearing means for pivotally supporting said cylinder, said bearing means being formed of a hollow square of plastic material.

2. A pretensioner arrangement according to claim 1 wherein said seal is resilient.

3. A pretensioner arrangement according to claim 1 wherein said seal is formed of a resilient plastic material.

4. A pretensioner arrangement for a vehicle safety restraint comprising
   a piston cylinder arrangement,
   a source of driving force for driving the piston,
   means for shortening the effective length of belt webbing responsive to movement of the driven piston,
   a mechanical pendulum sensor,
   a bearing for supporting said pendulum sensor so as to pivot said pendulum sensor under the action of an inertial crash acceleration force, from a first rest position to a second position in which said pendulum sensor activates the source of the driving force, wherein said bearing is formed of a hollow square of plastic material having first and second sets of two opposing sides, each side having an inner and an outer face and said first set being formed with a plurality of crush ribs on the inner faces of said first set, which ribs are structured and dimensioned to provide a close fit with a co-operating recessed region on a surface of the cylinder and said second set of opposing sides of the square have internal faces which are spaced from and do not grip the cylinder so that the bearing allows pivoting of the cylinder in a direction parallel to the first set of bearing sides but not in a direction parallel to said second set of non-engaging sides.

5. A pretensioner arrangement according to claim 4, wherein the co-operating surface of the cylinder is formed with a circumferential channel of semi-circular cross-section.

6. A pretensioner arrangement according to claim 4, wherein the four outer faces of the bearing are arranged to co-operate with internal features of a cylinder housing, wherein each of the two opposite outer faces of one of the sets of sides has an upwardly facing ledge to co-operate with respective inwardly deformable cut-outs on corresponding faces of the cylinder housing.

7. A pretensioner arrangement according to claim 6 wherein two outer faces of the second set of sides are provided with downwardly facing ledges so that the bearing is held fast in the housing and prevented from longitudinal and lateral movement.

8. A pretensioner arrangement for a vehicle safety restraint retractor comprising a gas generator which comprises a burst disc at one end through which the gas is released on detonation, the burst disc being circumscribed by a line of weakness around a substantial part of the burst disc periphery and having a segment of said periphery reinforced so that on detonation of the gas generator, the opened burst disc is retained attached to the gas generator by the reinforced segment.

9. A pretensioner arrangement for a vehicle safety restraint retractor, the pretensioner comprising
   a cylinder,
   a piston, slidably contained within the cylinder having a cable removing end,
   a gas generator, operable to release gas to produce a force to drive the piston along the cylinder,
   a cable having first and second ends and connected at said first end to the cable receiving end of the pistons,
   means for shortening the effective length of belt webbing available to a vehicle occupant, said means being connected to said second end of the cable,
   a compressible elastomeric energy absorbing seal provided on the piston at said cable receiving end thereof, for absorbing some of the force generated by the gas from the gas generator,
   wherein said gas generator comprises a burst disc at one end through which the gas is released on detonation, the burst disc being circumscribed by a line of weakness around a substantial part of the burst disc periphery and having a segment of said periphery reinforced so that on detonation of the gas. generator, the opened burst disc is retained attached to the gas generator by the reinforced segment.

10. A pretensioner arrangement according to claim 9 wherein the gas generator is formed of aluminium.

11. A pretensioner arrangement according to claim 10 wherein a first end of said gas generator is reinforced by a steel ring with a diameter slightly larger than the diameter of said first end.

12. A pretensioner arrangement for a vehicle safety restraint comprising
   a pretensioner housing,
   a piston-cylinder arrangement,
   a source of driving force including a gas generator for driving the piston,
   means for tensioning belt webbing responsive to movement of the driven piston,
   a mechanical pendulum sensor, having a first, supported end and a second, free end,
   a bearing for supporting said supported end of said pendulum sensor so as to pivot said supported end under the action of an inertial crash acceleration force, from a first rest-position to a second position in which said source of the driving force is activated,
   wherein said free end of the pendulum sensor comprises a first abutment, and said pretensioner housing comprises a co-operating sensor lever for restraining said first abutment, and a mounting hole for fixing the pretensioner in a vehicle by insertion of a mounting bolt therethrough, said lever being biased to a first restraining position and being movable to a second position in which said lever allows movement of the pendulum sensor when said mounting bolt is inserted through said mounting hole in the housing, wherein a first end of said gas generator is reinforced by a steel ring with a diameter slightly larger than the diameter of said first end and said sensor lever is arranged to rest against the gas generator in the region of the steel ring in said first restraining position.

13. A pretensioner arrangement according to claim 12 further comprising a steel pin incorporated into the structure of said sensor lever.

14. A pretensioner arrangement according to claim 13 wherein said sensor lever has a curved profile and a coating of molycote.

15. A pretensioner arrangement for a vehicle safety restraint comprising a pretensioner housing, a piston-cylinder arrangement, a source of driving force including a gas generator for driving the piston, means for tensioning belt webbing responsive to movement of the driven piston, a mechanical pendulum sensor, having a first supported end and a second, free end, a bearing for supporting said supported end of said pendulum sensor at to pivot said supported end under the action of an inertial crash acceleration force, from a first rest position to a second position in which said source of the driving force is activated, wherein said free end of the pendulum sensor comprises a first abutment, and said pretensioner housing comprises a co-operating sensor lever for restraining said first abutment, and a mounting hole for fixing the pretensioner in a vehicle by insertion of mounting a bolt therethrough, said lever being biased to a first restraining position and being movable to a second position in which said lever allows movement of the pendulum sensor when said mounting bolt is inserted through said mounting hole in the housing, wherein said pendulum sensor comprises said piston-cylinder arrangement having said first end supported on said bearing, and said second end hanging free, said first abutment being formed by an extension attached to said second, free end of the piston-cylinder arrangement, and the housing having a slot which is blocked by said lever in said first restraining position, and through which said extension can pass when the lever is in said second position.

16. A pretensioner arrangement according to claim 15 wherein said source of driving force is a gas generator.

17. A pretensioner arrangement according to claim 15 wherein the bearing is formed of two substantially identical moulded plastics L-shaped parts, one of which is turned through 180° relative to the other and the two of which are clipped together by tight fitting peg and hole connections.

* * * * *